United States Patent
Yannam et al.

(10) Patent No.: US 12,488,190 B2
(45) Date of Patent: Dec. 2, 2025

(54) MACHINE LEARNING (ML)-BASED DUAL LAYER CONVERSATIONAL ASSIST SYSTEM

(71) Applicant: Bank of America Corporation, Charlotte, NC (US)

(72) Inventors: Ramakrishna R. Yannam, The Colony, TX (US); Ion Gerald McCusker, Allen, TX (US); Prejish Thomas, Plano, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 18/074,653

(22) Filed: Dec. 5, 2022

(65) Prior Publication Data

US 2024/0184992 A1    Jun. 6, 2024

(51) Int. Cl.
*G06F 40/35* (2020.01)
*G10L 15/10* (2006.01)
*G10L 15/14* (2006.01)
*G10L 15/22* (2006.01)
*H04L 51/21* (2022.01)

(52) U.S. Cl.
CPC ............. *G06F 40/35* (2020.01); *G10L 15/10* (2013.01); *G10L 15/14* (2013.01); *G10L 15/22* (2013.01); *H04L 51/21* (2022.05)

(58) Field of Classification Search
CPC ......... G06F 40/35; G10L 15/10; G10L 15/14; G10L 15/22; H04L 51/21
See application file for complete search history.

(56) References Cited

U.S. PATENT DOCUMENTS

| | | | |
|---|---|---|---|
| 12,190,064 B2 * | 1/2025 | Millius | H04M 3/4931 |
| 2022/0247700 A1 * | 8/2022 | Bhardwaj | G06N 3/09 |
| 2023/0245651 A1 * | 8/2023 | Wang | G06N 5/022 |
| | | | 704/275 |
| 2024/0283868 A1 * | 8/2024 | Ferris | G06F 40/253 |
| 2025/0013821 A1 * | 1/2025 | Chittari | G06F 3/04847 |
| 2025/0016267 A1 * | 1/2025 | Willshire | G06F 16/22 |

* cited by examiner

*Primary Examiner* — Mohammad K Islam
(74) *Attorney, Agent, or Firm* — Weiss & Arons LLP

(57) ABSTRACT

Systems and methods for increasing accuracy in an online chat interface are provided. Methods may be executed via a machine-learning (ML)-based chat monitoring engine. Methods may include intercepting a request utterance. Methods may include computing, via a trained ML model, an intent of the request utterance; generating a target response to the request utterance; intercepting a response utterance; and calculating a difference between the response utterance and the target response. In response to the difference being less than a threshold difference, methods may include releasing the response utterance to be transmitted as a response message. In response to the difference being more than a threshold difference, methods may include preventing the response utterance from being transmitted as a response message, generating a revised response utterance that is less than a threshold difference apart from the target response, and transmitting the revised response as a response message to a remote computing device.

20 Claims, 5 Drawing Sheets

MACHINE LEARNING (ML)-BASED DUAL LAYER CONVERSATIONAL ASSIST SYSTEM

FIELD OF TECHNOLOGY

Aspects of the disclosure relate to digital systems. Specifically, aspects of the disclosure relate to machine-learning (ML)-based conversational assist systems.

BACKGROUND OF THE DISCLOSURE

Many entities interface with users and customers using online chat systems. The online chat systems provide a mechanism for the users and customers to transmit messages requesting services and support. In response, the online chat systems are designed to transmit messages responding to the users and customers and provide services and support.

Sometimes, the chat systems provide responses that contain inaccuracies. An inaccuracy in the response can cause the user or customer frustration, or in some cases, even emotional, financial, and/or physical harm.

It would be desirable, therefore, to provide systems and methods for conversational assist systems that increase the accuracy of responses in an online chat system.

SUMMARY OF THE DISCLOSURE

Aspects of the disclosure relate to systems and methods for a machine learning (ML)-based conversational assist system. Systems may include an online chat interface. The online chat interface may be configured to receive online chat messages from a plurality of remote user devices, and transmit response messages to the plurality of remote user devices.

Systems may include an ML chat monitoring engine. The ML chat monitoring engine may be configured to intercept a request utterance. The request utterance may be an online chat message received from one of the remote computing devices. The request utterance may represent a customer request.

Systems may be configured to compute, via a trained ML model, an intent of the request utterance, and generate, via the trained ML model, a target response to the request utterance.

Systems may be configured to receive a response utterance. The response utterance may be a response message generated by the online chat interface for responding to the request utterance. The response utterance may be intercepted by the ML chat monitoring engine.

Systems may be configured to calculate a difference between the response utterance and the target response.

In response to the difference being less than a threshold difference, systems may be configured to release the response utterance to be transmitted as a response message to the one of the remote computing devices.

In response to the difference being more than a threshold difference, systems may be configured to prevent the response utterance from being transmitted as a response message to the one of the remote computing devices, generate a revised response utterance that is less than a threshold difference apart from the target response, and transmit the revised response as a response message to the one of the remote computing devices.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
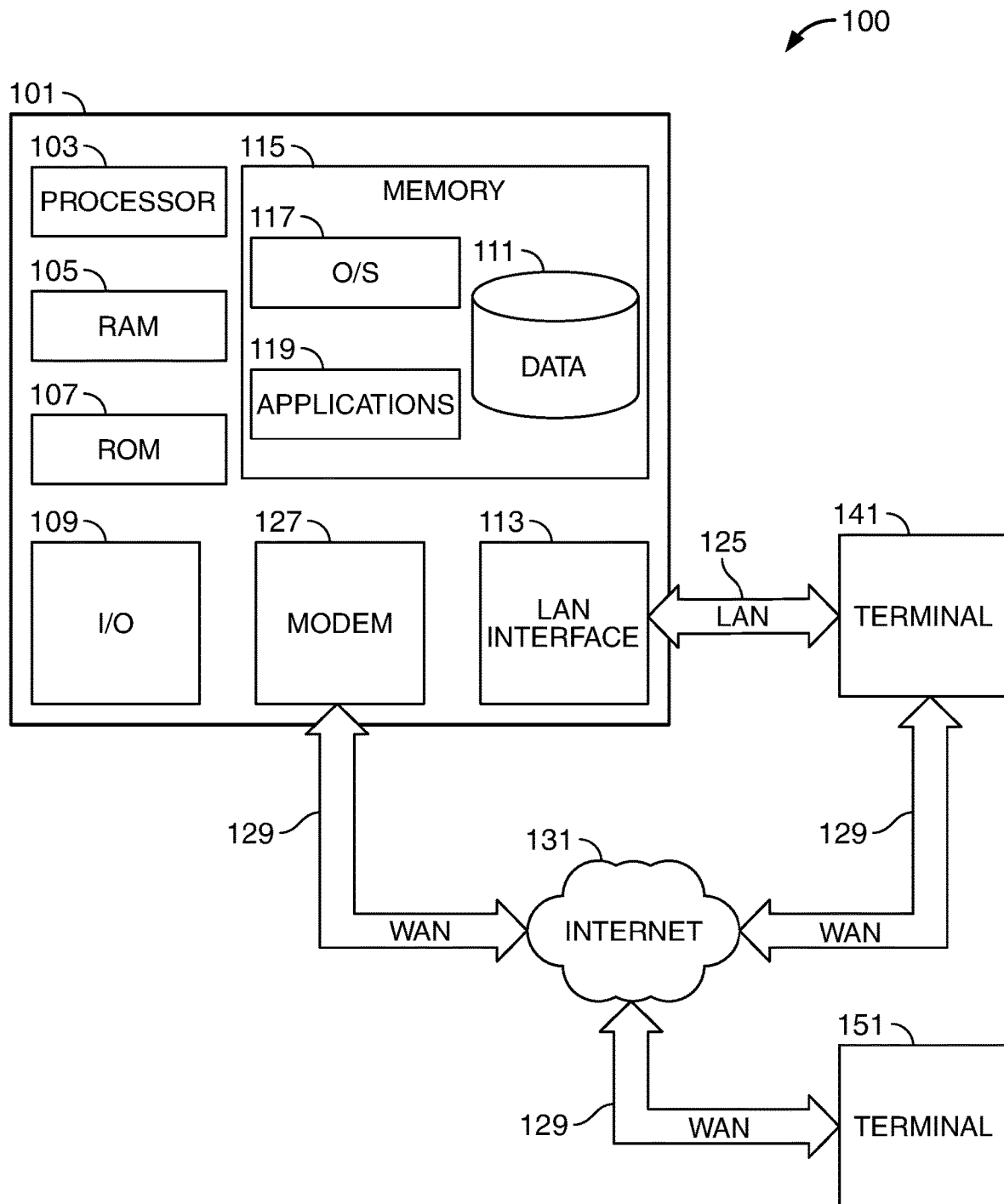
FIG. 1 shows an illustrative system in accordance with principles of the disclosure.

Aspects of the disclosure relate to systems and methods for a machine learning (ML)-based conversational assist system. System features and configurations may correspond to steps of the methods. Systems may include an online chat interface. The online chat interface may be configured to receive online chat messages from a plurality of remote user devices, and transmit response messages to the plurality of remote user devices.

The chat interface may, for example, be a computer system that hosts or otherwise facilitates customer service chat conversations. The customer service chat conversations may involve receiving customer service request messages from the remote user devices, and transmitting chat messages to the respective remote user device in response to the requests.

Systems may include an ML chat monitoring engine. The ML chat monitoring engine may be configured to intercept a request utterance. Intercepting the request utterance may include routing the request utterance to the ML chat monitoring system prior to, or in parallel with, routing the request utterance to the chat interface. The request utterance may be an online chat message received from one of the remote computing devices. The request utterance may represent a customer request.

Systems may be configured to compute, via a trained ML model, an intent of the request utterance. The intent of an utterance may include a representation of the meaning of the utterance. Computing the intent may include computing a numerical representation of the meaning. The numerical representation may, for example, include a score along multiple dimensions. Each dimension may represent a different aspect of meaning. The combination of scores along the multiple dimensions may be a multi-dimensional vector value that represents an overall meaning of the utterance. The intent may, in certain embodiments, be stored in a multi-dimensional vector data structure.

Systems may be configured to generate, via the trained ML model, a target response to the request utterance. The target response may be the output of an ML model. The ML model may be trained on training data that includes requests mapped to appropriate responses. The training data may include artificial model data. The training data may include historical data that may include historical chat conversations. The target response may be based, at least in part, on a mapping. The mapping may associate certain requests with certain responses. The mapping may link certain request intents with certain responses. The mapping may link certain request intents with certain response intents, which may in turn be linked to certain response utterances.

Systems may be configured to receive a response utterance. The response utterance may be a response message generated by the online chat interface for responding to the request utterance. The response utterance may be intercepted by the ML chat monitoring engine. The online chat interface may transmit the response utterance to the ML chat monitoring engine prior to transmitting the response to the user device. The ML chat monitoring engine may pull the response from the online chat interface before the response is transmitted to the user device.

Systems may be configured to calculate a difference between the response utterance and the target response. The difference may be a distance. The distance may be calculated as the Euclidian distance measured between a point representing the response utterance and a point representing the target response. The points may be represented by the numerical representations associated with the intents of the response utterance and the target response. The points may be multi-dimensional. For example, each dimension may represent a value of the utterance vis-à-vis one aspect of meaning.

For example, in certain embodiments, in order to calculate the difference between the response utterance and the target response, the system may be configured to compute, via the trained ML model, an intent of the target response, and compute, via the trained ML model, an intent of the response utterance. The system may then be configured to calculate a difference between the intent of the response utterance and the intent of the target response.

The difference may also be a difference with respect to a measure of accuracy. For example, the target response may be associated with an accuracy score. The response utterance may also be associated with an accuracy score. The difference between the accuracy score of the response utterance and the accuracy score of the target response may be the difference between the response utterance and the target response.

In response to the difference being less than a threshold difference, systems may be configured to release the response utterance to be transmitted as a response message to the one of the remote computing devices.

In response to the difference being more than a threshold difference, systems may be configured to prevent the response utterance from being transmitted as a response message to the one of the remote computing devices. Systems may generate a revised response utterance that is less than a threshold difference apart from the target response. Systems may transmit the revised response as a response message to the remote computing device which transmitted the request utterance. In certain embodiments, the revised response may be the target response.

Some embodiments may include a database storing user information. For example, a financial institution running a customer service chat tool may link to the chat tool a database storing comprehensive customer data. The database may be used in generating the target response. Furthermore, a scenario when the response utterance includes information that is inconsistent with the user information stored in the database may qualify as a difference between the response utterance and the target response that is considered more than a threshold difference.

In certain embodiments, the ML chat monitoring engine may run silently in background without any indication to the remote computing devices or the online chat interface. The revised chat responses may be automatically transmitted to the remote device instead of the response utterance.

In some embodiments, the ML chat monitoring engine may transmit an alert to the online chat interface indicating that response utterance is being replaced with the revised response.

In certain embodiments, in response to the alert, the online chat interface may be configured to present selectable options to an administrator of the online chat interface. The options may include an option to accept the replacement, an option to reject the replacement, and/or any other suitable selectable option.

In some embodiments, the online chat interface may include a display screen that is viewable by the administrator. In certain embodiments, the display screen may be configured to include a persistent sidebar that displays the alert and the selectable options.

In some embodiments, the request utterance may originate as a telephonic voice request, and the telephonic voice request may be converted to the online chat message.

In certain embodiments, the request utterance and the response utterance may be one request utterance and one response utterance that are part of a chat conversation that includes multiple request utterances and response utterances. The ML chat monitoring engine may be further configured to generate a target response and calculate the difference between the target response and the response utterance for each request utterance and response utterance of the chat conversation.

A dual layer ML-based conversational assist system is thus provided. The system may increase the accuracy of digital conversational systems by providing a second layer that monitors and improves upon the first layer, while maintaining certain advantages of the first layer, such as a quicker response and/or a more natural sounding response.

The first layer may include human input. In some embodiments, the first layer may be fully automated. The second layer may be fully automated. The first layer may have some advantages and the second layer may have certain advantages. The first layer may be associated with more "natural" responses, particularly when the first layer includes human input. The first layer may include less processing, and may therefore be associated with quicker response times. The second layer may be associated with increased accuracy, particularly when used in conjunction with a comprehensive informational database. The increased accuracy may come along with increased processing, and may therefore be associated with longer response times than the first layer.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to online chat systems. The input/output module may also include one or more speakers for providing audio output and a video display device for providing textual, audio, audiovisual, and/or graphical output. The input and output may be related to computer application functionality. The input and output may be related to online chat systems.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to online chat systems.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
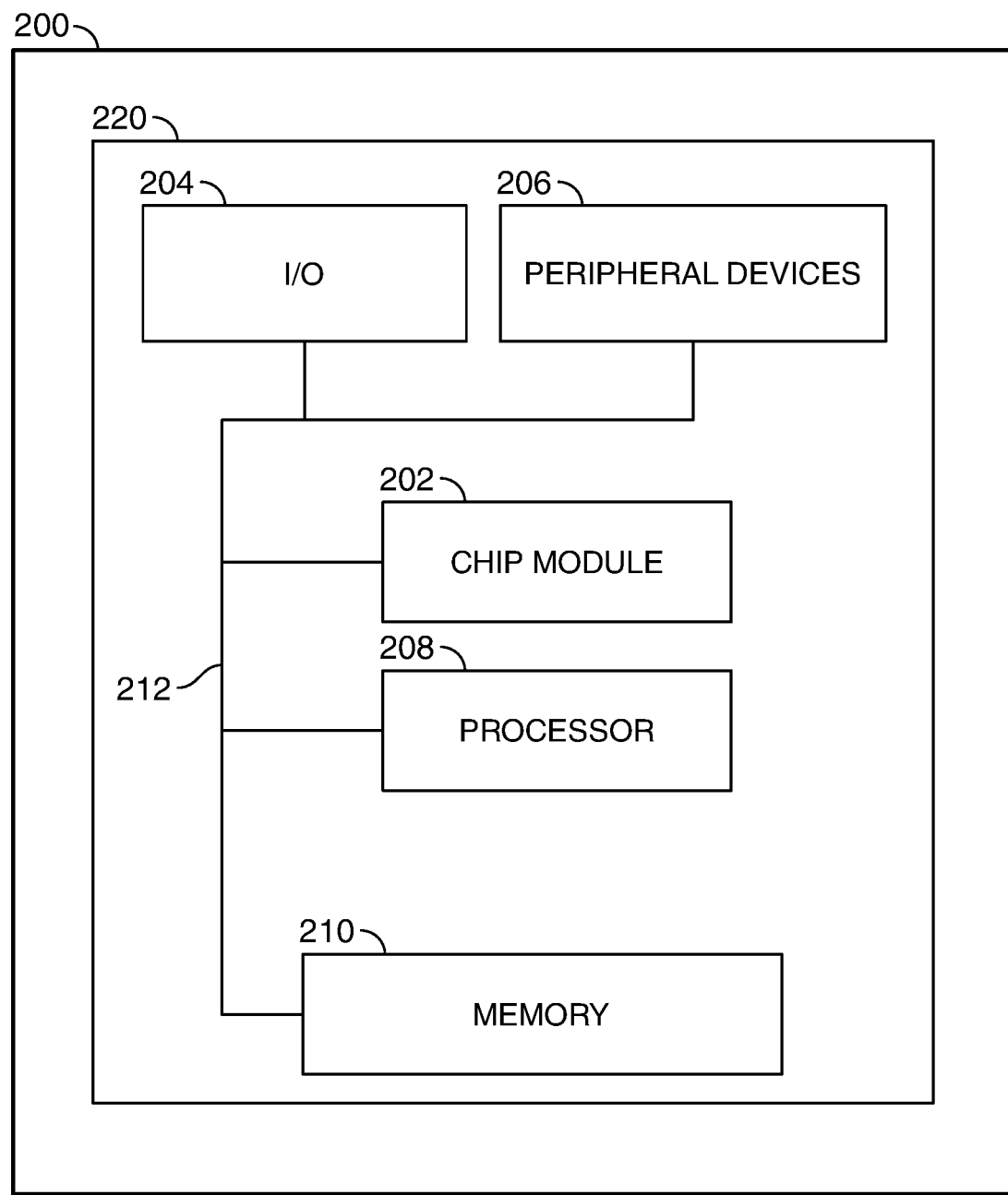
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
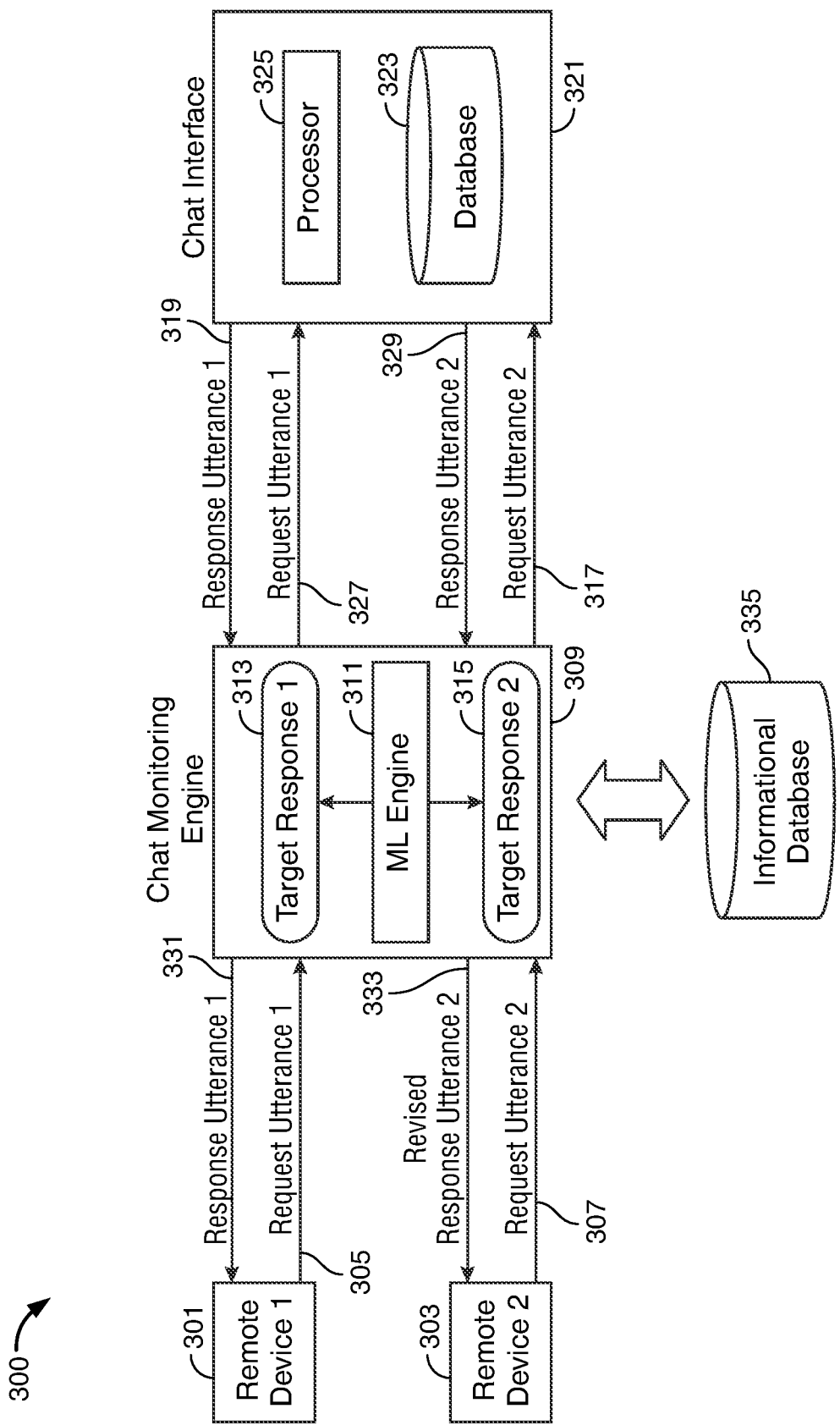
FIG. 3 shows an illustrative diagram in accordance with principles of the disclosure.

FIG. 3 shows illustrative diagram 300 in accordance with aspects of the disclosure. Diagram 300 shows one embodiment of an ML-based dual layer conversational assist system. The system may include chat monitoring engine 309 and online chat interface 321. Chat interface 321 may include database 323 and processor 325. Database 323 may include computer code configured to run on processor 325. Chat monitoring engine 309 may include ML engine 311. Chat monitoring engine 309 may also include a database storing computer code configured to run on a processor. Running the code on the processor may execute system features and method steps.

Diagram 300 shows remote device 1 (301) and remote device 2 (303). Remote device 1 (301) and remote device 2 (303) may be user devices communicating with the conversational assist system. Remote device 1 (301) and remote device 2 (303) may be two of many remote user devices.

Remote device 1 (301) may transmit request utterance 1 (305). Chat monitoring engine 309 may intercept request utterance 1 (305) and may generate target response 1 (313) via ML engine 311. Chat interface 321 may receive request utterance 1 (327) and may generate response utterance 1 (319). Chat monitoring engine 309 may intercept response utterance 1 (319) and may compare response utterance 1 (319) with target response 1 (313). When the difference does not exceed a threshold difference, chat monitoring engine 309 may allow response utterance 1 (331) to be transmitted, unchanged, to remote device 1 (301).

Remote device 2 (303) may transmit request utterance 2 (307). Chat monitoring engine 309 may intercept request utterance 2 (307) and may generate target response 2 (315) via ML engine 311. Chat interface 321 may receive request utterance 2 (317) and may generate response utterance 2 (329). Chat monitoring engine 309 may intercept response utterance 2 (329) and may compare response utterance 2 (329) with target response 2 (315). When the difference exceeds a threshold difference, chat monitoring engine 309 may prevent response utterance 2 (329) from being transmitted, unchanged, to remote device 1 (301). Instead, chat monitoring engine 309 may generate revised response utterance 2 (333) and may transmit (or cause chat interface 321 to transmit) revised response utterance 2 (333) to remote device 2 (303).

Figure 4:
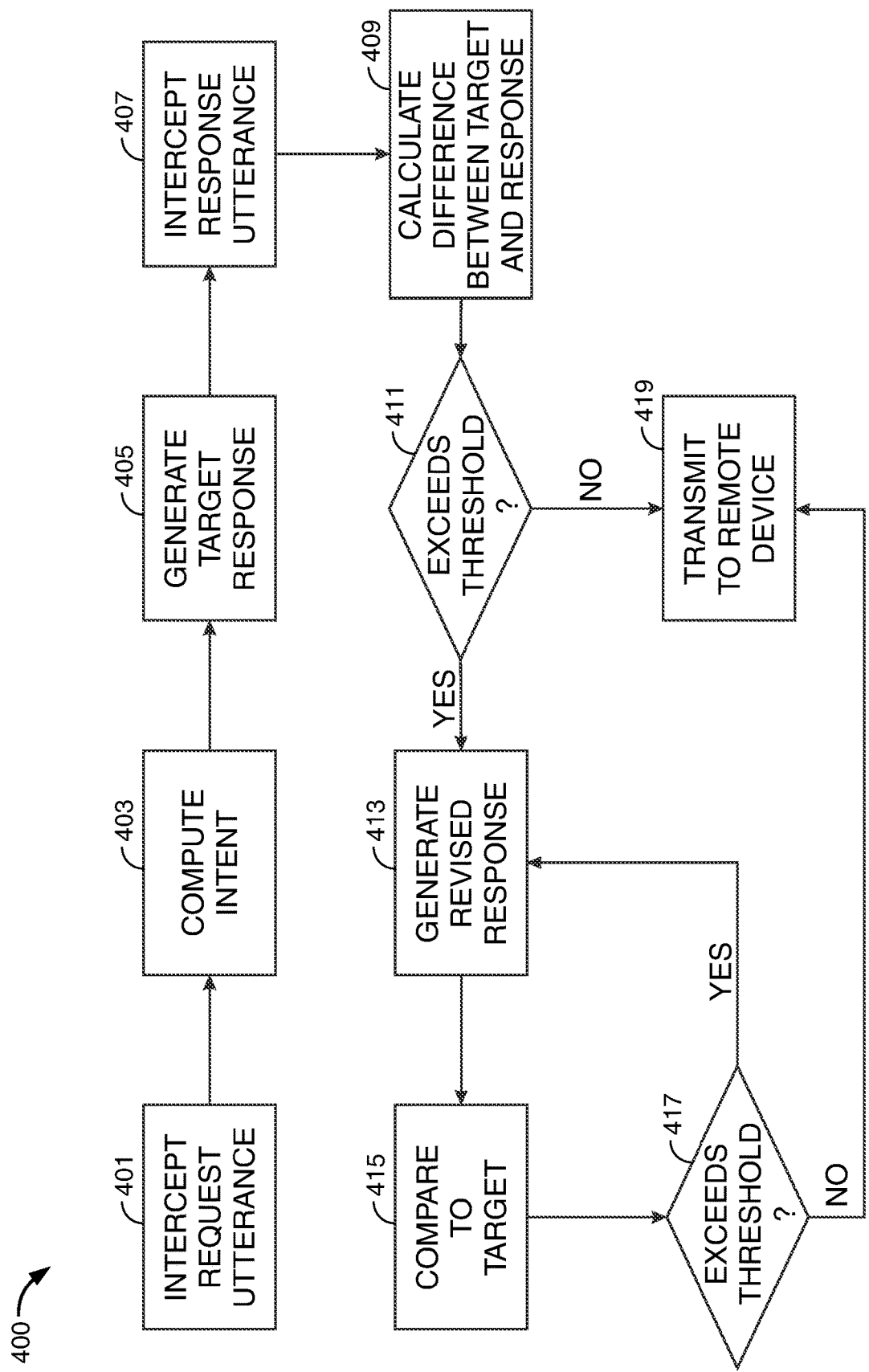
FIG. 4 shows an illustrative flowchart in accordance with principles of the disclosure.

FIG. 4 shows illustrative flowchart 400 in accordance with aspects of the disclosure. Flowchart 400 shows one embodiment of a process flow of an ML-based dual layer conversational assist system. At step 401 the system may intercept a request utterance. At step 403 the system may compute an intent of the request utterance. At step 405 the system may generate a target response to the request utterance. At step 407 the system may intercept a response utterance that may have been generated by an online chat interface which a user device may be chatting, and to which the user device may have transmitted the request utterance.

At step 409 the system may calculate a difference between the target response and the response utterance. At step 411 the system may query if the difference exceeds a predetermined threshold difference. If the difference does not exceed the threshold, the system may proceed to step 419 and transmit the response utterance (unchanged) to the user device. If the difference does exceed the threshold, the system may generate a revised response at step 413. At step 415 the system may compare the revised response to the target response. At step 417, the system may query if the difference exceeds a predetermined threshold difference. If the difference exceeds the threshold, the system may return to step 413 and generate another revised response, and proceed from there. If the difference does not exceed the threshold at step 417, the system may proceed to step 419 and transmit the revised response to the user device.

Figure 5:
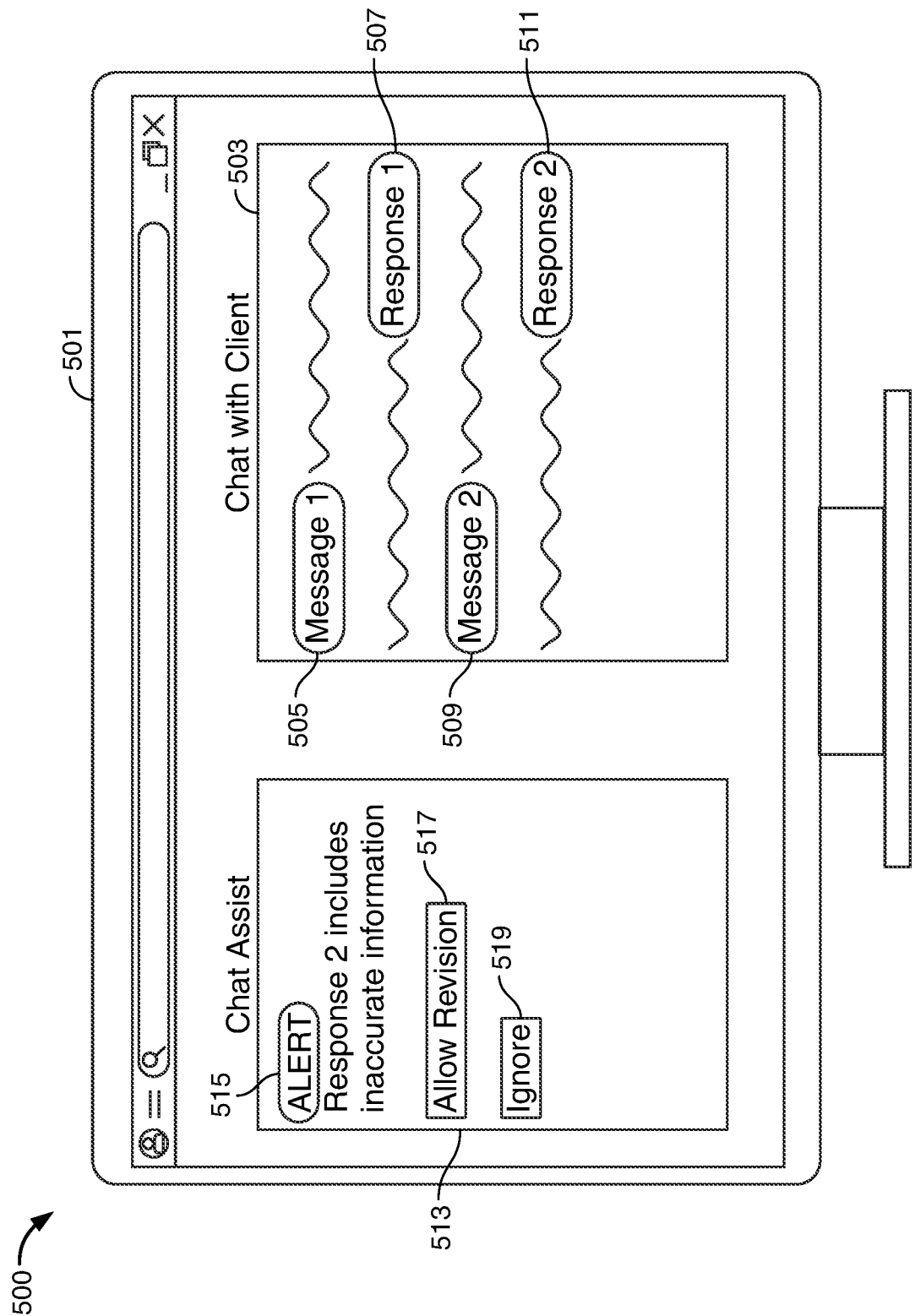
FIG. 5 shows an illustrative diagram in accordance with principles of the disclosure.

FIG. 5 shows illustrative diagram 500 in accordance with aspects of the disclosure. Diagram 500 shows one embodiment of a display screen 501 of an online chat interface of an ML-based dual layer conversational assist system.

Display screen 501 may be the screen presented on a device associated with an administrator of the chat interface. The administrator may, in certain embodiments, be monitoring an automated chat conversational system. In some embodiments, the administrator may be manually generating chat responses and entering the responses via the device.

Display screen 501 includes chat portion 503 and chat assist portion 513. Chat portion 503 may show messages that make up a chat conversation with a client or customer. The chat conversation may, for example, include message 1 (505), response 1 (507), message 2 (509), and response 2 (511).

Chat assist portion 513 may be a persistent sidebar that is permanently displayed at a side of the display throughout a chat conversation. Chat assist portion 513 may display alerts 515. Alerts 515 may include messages indicating that the chat monitoring engine may have determined that a response may be inaccurate. For example, a response typed into chat 503 may include an account balance. Before the response is actually transmitted to a customer device, the chat monitoring engine may determine that the account balance is inaccurate, and may generate a revised response that includes the correct account balance. The alert message may notify the administrator of the inaccuracy and present selectable options. The selectable options may, for example, include option 517 to allow the revision. Selecting option 517 may trigger the system to automatically replace the original response message with the revised response (e.g., with the correct account balance). The selectable options may, for example, include option 519 to ignore the revision. Selecting option 519 may trigger the system to release the original response message as is.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a machine learning (ML)-based conversational assist system are provided. Persons skilled in the art will appreciate that the present invention can be practiced by other than the described embodiments, which are presented for purposes of illustration rather than of limitation, and that the present invention is limited only by the claims that follow.

What is claimed is:

1. A dual layer machine learning (ML)-based conversational assist system, the system comprising:
    a processor, a non-transitory memory, and computer executable instructions stored in the memory and configured to run on the processor;
    an online chat interface, said online chat interface that is configured to:
        receive online chat messages from a plurality of remote user devices; and
        generate and transmit response messages to the plurality of remote user devices; and
    an ML chat monitoring engine, said ML chat monitoring engine that is configured to:
        intercept a request utterance, wherein said request utterance:
            is an online chat message received from one of the remote computing devices; and
            represents a customer request;
        compute, via a trained ML model, an intent of the request utterance;
        generate, via the trained ML model, a target response to the request utterance;
        intercept a response utterance, wherein the response utterance is a response message generated by the online chat interface for responding to the request utterance;
        calculate a difference between the response utterance and the target response;
        in response to the difference being less than a threshold difference, release the response utterance to be transmitted as a response message to the one of the remote computing devices; and
        in response to the difference being more than a threshold difference:
            prevent the response utterance from being transmitted as a response message to the one of the remote computing devices;
            generate a revised response utterance that is less than a threshold difference apart from the target response; and
            transmit the revised response as a response message to the one of the remote computing devices.

2. The system of claim 1 further comprising a database storing user information, and wherein a scenario when the response utterance includes information that is inconsistent with the user information stored in the database creates a difference between the response utterance and the target response that qualifies as more than a threshold difference.

3. The system of claim 1 wherein the ML chat monitoring engine runs silently in background without any indication to the remote computing devices or the online chat interface.

4. The system of claim 1 wherein the ML chat monitoring engine transmits an alert to the online chat interface indicating that response utterance is being replaced with the revised response.

5. The system of claim 4 wherein, in response to the alert, the online chat interface is configured to present selectable options to an administrator of the online chat interface, said options comprising an option to accept the replacement and an option to reject the replacement.

6. The system of claim 5 wherein:
    the online chat interface comprises a display screen that is viewable by the administrator; and
    the display screen is configured to include a persistent sidebar that displays the alert and the selectable options.

7. The system of claim 1 wherein the revised response is the target response.

8. The system of claim 1 wherein, to calculate the difference between the response utterance and the target response, the system is configured to:
    compute, via the trained ML model, an intent of the target response;
    compute, via the trained ML model, an intent of the response utterance; and
    calculate a difference between the intent of response utterance and the intent of the target response.

9. The system of claim 1 wherein the request utterance originates as a telephonic voice request, and the telephonic voice request is converted to the online chat message.

10. The system of claim 1 wherein the request utterance and the response utterance are one request utterance and one response utterance that are part of a chat conversation comprising a plurality of request utterances and a plurality of response utterances, and the ML chat monitoring engine is further configured to generate a target response and calculate the difference between the target response and the response utterance for each request utterance and response utterance of the chat conversation.

11. A dual layer method for increasing accuracy in an online chat interface via a machine-learning (ML)-based chat monitoring engine, said online chat interface that is configured to receive online chat messages from a plurality of remote user devices, and generate and transmit response messages to the plurality of remote user devices, the method comprising:
    intercepting a request utterance, wherein said request utterance:
        is an online chat message received from one of the remote computing devices; and
        represents a customer request;
    computing, via a trained ML model, an intent of the request utterance;
    generating, via the trained ML model, a target response to the request utterance;
    intercepting a response utterance, wherein the response utterance is a response message generated by the online chat interface for responding to the request utterance;
    calculating a difference between the response utterance and the target response;

in response to the difference being less than a threshold difference, releasing the response utterance to be transmitted as a response message to the one of the remote computing devices; and in response to the difference being more than a threshold difference:
- preventing the response utterance from being transmitted as a response message to the one of the remote computing devices;
- generating a revised response utterance that is less than a threshold difference apart from the target response; and
- transmitting the revised response as a response message to the one of the remote computing devices.

12. The method of claim 11 wherein, in a scenario when the response utterance includes information that is inconsistent with user information stored in a database, a difference between the response utterance and the target response is created that qualifies as more than a threshold difference.

13. The method of claim 11 wherein the ML chat monitoring engine runs silently in background without any indication to the remote computing devices or the online chat interface.

14. The method of claim 11 further comprising transmitting an alert to the online chat interface indicating that response utterance is being replaced with the revised response.

15. The method of claim 14 further comprising, in response to the alert, presenting selectable options on the online chat interface to an administrator of the online chat interface, said options comprising an option to accept the replacement and an option to reject the replacement.

16. The method of claim 15 wherein:
the online chat interface comprises a display screen that is viewable by the administrator; and
the display screen is configured to include a persistent sidebar that displays the alert and the selectable options.

17. The method of claim 11 wherein the revised response is the target response.

18. The method of claim 11 wherein, to calculate the difference between the response utterance and the target response, the method further comprises:
- computing, via the trained ML model, an intent of the target response;
- computing, via the trained ML model, an intent of the response utterance; and
- calculating a difference between the intent of response utterance and the intent of the target response.

19. The method of claim 11 wherein the request utterance originates as a telephonic voice request, and the method further comprises converting the telephonic voice request to the online chat message.

20. The method of claim 11 wherein the request utterance and the response utterance are one request utterance and one response utterance that are part of a chat conversation comprising a plurality of request utterances and a plurality of response utterances, and the method further comprises generating a target response and calculating the difference between the target response and the response utterance for each request utterance and response utterance of the chat conversation.

* * * * *